United States Patent

[11] 3,576,479

| [72] | Inventor | Joseph E. Oeschger |
| | | Palo Alto, Calif. |
| [21] | Appl. No. | 9,663 |
| [22] | Filed | Feb. 9, 1970 |
| [45] | Patented | Apr. 27, 1971 |
| [73] | Assignee | International Telephone and Telegraph Corporation |
| | | New York, N.Y. |

[54] TEMPERATURE COMPENSATED LEAD SCREW
10 Claims, 1 Drawing Fig.
[52] U.S. Cl............................................ 317/245,
                                                  317/251
[51] Int. Cl............................................ H01g 5/14,
                                                  H01g 5/34
[50] Field of Search..................................... 317/245,
       249 (R), 249 (T), 251; 338/8; 336/(Inquired)

[56] References Cited
UNITED STATES PATENTS

| 2,740,926 | 4/1956 | Jennings et al. | 317/245 |
| 2,740,927 | 4/1956 | Jennings et al. | 317/245 |
| 2,883,593 | 4/1959 | Jennings........... | 317/251X |
| 3,257,590 | 6/1966 | Hansen............. | 317/245 |
| 3,270,259 | 8/1966 | Oeschger.......... | 317/245X |

Primary Examiner—Laramie E. Askin
Attorneys—C. Cornell Remsen, Jr., Walter J. Baum, Paul W. Hemminger, Charles L. Johnson, Jr. and Thomas E. Kristofferson ABSTRACT: A temperature compensated lead screw for use in a device, such as a vacuum capacitor, in which an electrical parameter is controlled by position of a shaft operating through a vacuum-sealing flexible metal bellows into an evacuated envelope. The shaft position is, in turn, the result of the lead screw acting against a threaded member. The lead screw assembly is composed of an externally threaded sleeve slip-fit onto a mandrel and welded, or other wise tightly bonded, at a single discrete location along the common mandrel/sleeve axial length. Normally the sleeve has a relatively high predetermined thermal coefficient of expansion and the mandrel a low coefficient, if the device controlled is a vacuum capacitor.

The heating effect, and therefore the resulting capacitance change through expansion effects in a vacuum capacitor handling RF power, is a complex function of factors, including capacitance value. The desired counteractive shaft expansion is therefore a function of capacitance (lead screw) setting. The structure described provides a counteraction for internal heating expansion effects in devices of the character described. If the bond between the sleeve and mandrel is not at the extreme end of the lead screw assembly, then for example, positive overall lead screw expansion is obtained corresponding to thread engagement on one side of the bond, and negative for a thread engagement on the opposite side of the bond.

Patented April 27, 1971
3,576,479
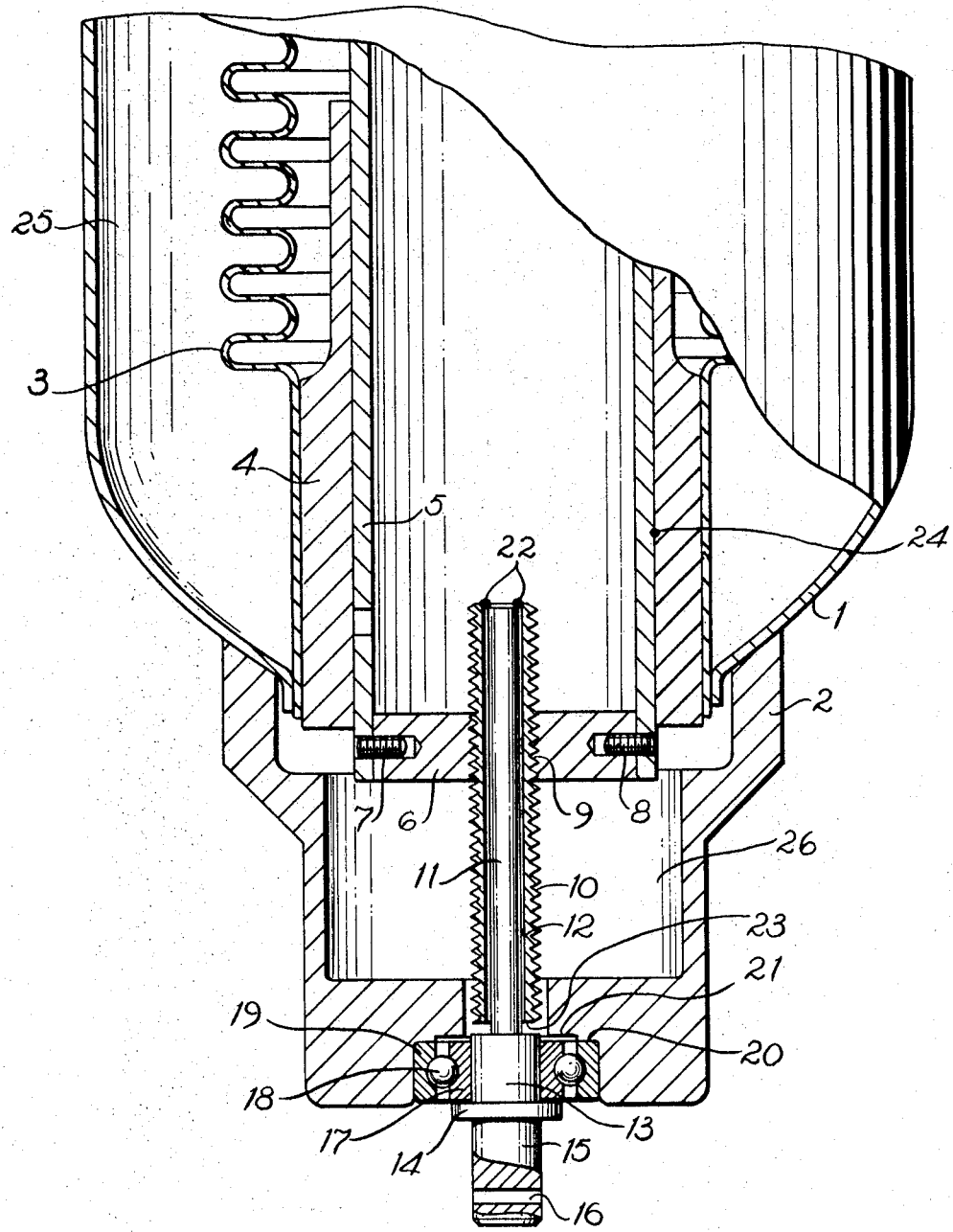
INVENTOR.
JOSEPH E. OESCHGER
BY William T. O'Nail
AGENT.

TEMPERATURE COMPENSATED LEAD SCREW

BACKGROUND OF THE INVENTION

1. Field of the Invention

The invention relates generally to devices for compensation of thermal expansion, and more particularly, to mechanical translation-controlling structure providing compensatory thermal expansion of predeterminable magnitude and sense.

2. Description of the Prior Art

In the realm of adjustable electrical circuit components, such as variable capacitors, inductors, rheostats, etc., a mechanical force and motion brings about the adjustment of the value of capacitance, inductance, or resistance of the particular component. All such devices used in connection with high power applications present particular problems arising from the heat internally generated in the component, due to electrical losses therein. The sources of these losses are well known; they include IR drops, eddy currents and hysteresis, which are typical power loss producing phenomena.

Many of the devices of those types of adjustable parameter electrical components are used in circuits where their loss heating varies as the said parameter varies.

In vacuum variable capacitors, a common prior art approach to the problem of minimizing capacitance drift due to heating, has been the use of materials of low thermal expansion coefficient for parts, the expansion of which would significantly affect the value of capacitance. Obviously, correction is only partial and then only in one sense. Compensatory expansion is not envisioned in such a device, and therefore the correction cannot be better than partial.

Another prior art problem encountered is the variable expansion effect of heating which is a function of the setting of the variable parameter device, i.e., the engagement of the plates in a variable capacitor, for example. In many circuit applications, the RF current flowing in the capacitor is related to capacitance value (plate engagement) in a complex manner.

Prior art methods make no particular provision for the variable expansion compensation sometimes required as the capacitance is varied. The said compensatory expansion, when introduced, may be required in either sense or may change from positive to negative at some point in the range of parameter adjustment.

The foregoing prior art problems generated the need for a simple lead screw arrangement which would be capable of providing temperature compensation in devices of the character described.

The prior art in respect to lead screw-operated vacuum variable capacitors is typically represented in U.S. Pat. Nos. 2,740,926, 2,740,927 and also in 3,257,590. Materials, assembly methods and other details of the practice of this art are also well known in the patent literature and other technical publications.

SUMMARY OF THE INVENTION

In consideration of the prior art and its disadvantages, the general objective of the present invention may be said to have been the provision of a lead screw assembly which is capable of providing a predetermined coefficient of axial thermal expansion which may be of either sense and which can be built to compensate for the thermal expansion effects of structural members of a variable parameter device, such as a variable vacuum capacitor.

The novel device may be said to be a lead screw assembly which includes a mandrel which is rotated for capacitor control. A threaded sleeve is slip-fit over the mandrel and is attached to the mandrel at a single predetermined location along the length of said sleeve. The mandrel is axially constrained with respect to the control end of the housing of the device, but has rotational freedom. The threaded sleeve engages a threaded member which is operatively linked to the movable element (movable plates in a vacuum capacitor) and moves it axially in response to rotation of the mandrel. The thermal expansion of the threaded sleeve occurs with respect to the said attachment, and thereby introduces the desired predetermined compensatory axial thermal expansion factor to the movable element linkage. The said compensatory expansion may be said to be effective as a force applied between the point of mandrel axial constraint and the point of threaded sleeve engagement with the said threaded member.

BRIEF DESCRIPTION OF THE DRAWING

The FIGURE illustrates the details of a lead screw as contemplated in one embodiment of the invention as applied to a variable vacuum capacitor.

DESCRIPTION OF THE PREFERRED EMBODIMENT

The FIGURE herewith, illustrates a lead screw in accordance with the present invention, installed in a typical vacuum capacitor, only the essential directly cooperating parts of which are illustrated.

The typical vacuum capacitor is of the general form shown in U.S. Pat. No. 2,740,926. An endbell piece 1 is shown without the attached glass or ceramic body to which it would normally be sealed, above the point where, the FIGURE is cut off. The capacitor plates are also omitted from the illustration, but it is to be understood that the movable plates are controlled in accordance with axial translation of the tubular shaft member 5 (axial being in the up and down direction as viewed on the FIGURE). The said endbell 1 is firmly joined to the tubular bearing member 4. The vacuum sealing bellows 3, being joined to 4, as illustrated, performs the well-known function of allowing axial freedom for the shaft member 5 and the plates and other movable parts within the evacuated vessel. A portion of the evacuated volume shows at 25. A shaft end plate 6 within the lower end of 5 is affixed by set screws, typically 7 and 8. A threaded central hole in 6 provides a thread engagement 9 with the sleeve 10 of the lead screw assembly. The said lead screw assembly comprises the mandrel 11 having integral head portions at 13 and 15, flanged at 14. A thrust resisting bearing comprises inner and outer races 17 and 19, respectively, and balls, typically 18. The entire thrust resisting ball bearings fit into a counterbore in the end cap 2. The counterbore provides a shoulder at 20, against which the outer race of the said bearing rests, normally the bearing would be pressed fit into this counterbore. An additional concentric counterbore of slightly smaller diameter forms the relief shoulder at 21, so that the inner bearing race is not frictionally engaged (bottomed). The mandrel head flange 14 rests against the inner bearing race in conventional manner, as illustrated. It will be realized that the atmospheric pressure in the cavity 26 strongly biases the shaft member 5 upward, i.e., in a manner so as to tend to fully mesh the capacitor plates.

The threaded sleeve 10 is slideably fit over the mandrel 11 along the surface 12. The sliding surface 12 is exaggerated as presented in the FIGURE, in order to make the relationship of the sleeve and mandrel clear. As illustrated, the sleeve is only joined to the mandrel at one location, to wit, at the weld 22.

Accordingly, it will be observed that a rotational engagement of the mandrel head portion 15, as for example, by means of a shear pin engagement through the hole 16, would provide for axial control of the shaft member 5, along the sliding surface 24, as the lead screw assembly is turned.

In the practical vacuum capacitor, materials are selected which fulfill environmental and functional requirements with the result that a net overall (uncorrected) coefficient of expansion may be comparatively large or quite small. It may, moreover, be either positive or negative. In this context, positive is arbitrarily assumed to be in a direction so as to increase capacitor plate mesh (capacitance) with increasing temperature. Negative would then mean withdrawal of plates with increased temperature.

Axial expansion of the capacitor plates (cans) would, of itself, tend to increase capacitance. Expansion of the envelope including 1 and the glass or ceramic body (not shown) would tend to withdraw the plates (negative effect), as also would expansion of 2. Accordingly, it will be seen that there are many possibilities as to the net overall effect of heating of such a vacuum capacitor. Combination of materials, hot spots, and ability of the assembly to dissipate heat are all pertinent factors in determining the magnitude of the net overall coefficient of expansion effective at the plates. This net expansion coefficient will also be understood to be either positive or negative, depending upon those same material and construction factors.

Since expansion of a prior art lead screw is aforementioned prior art devices is such as to be positive, compensation by choice of lead screw materials can only have a net positive effect, however minimal it may be in magnitude.

In the structure of the present invention, however, it will be seen that a net negative lead screw effect (compensation) is obtained if he mandrel 11 is made of material having a relatively low coefficient of expansion, and the sleeve 10 is of a material having a higher coefficient. The sleeve 10 expands backward at its end 23 from the relatively fixed weld point 22, providing this negative or compensational expansion.

It will be apparent that the weld attachment 22 could be replaced by a pin or some other means of attachment, and the said attachment could be located at some other point along the sliding surface 12. If it were approximately at the midpoint along the length of 10, the overall net compensational expansion would change from negative to positive as the screw engagement with 6 crosses over this attachment during rotation of 10 to withdraw shaft member 5 (translate 5 downward as illustrated on the FIGURE). The exact location of the said attachment is a matter of design for the desired compensational effect in view of the sum of the expansion factors aforementioned.

In a typical lead screw according to the invention, the mandrel 11 and its integral parts 13, 14 and 15 were Invar, the threaded sleeve 10 was 300 series stainless steel and the mandrel-to-threaded sleeve attachment was by means of a heliarc weld bead as shown in the FIGURE Various modifications and variations falling within the scope of the present invention will suggest themselves to the reader skilled in these arts. The drawing and description are intended to by typical and illustrative only, and not for defining the scope of the inventive concepts.

I claim:

1. A temperature compensating lead screw adapted for engaging a member for controlling the axial translation of apparatus to vary a parameter, said parameter being subject to change as a function of temperature, said temperature resulting from heating, comprising:
    a threaded sleeve of first material having a first thermal coefficient adapted to engage a threaded member over a relatively small length of said sleeve for varying said parameter as a function of rotation of said sleeve;
    a mandrel of second material having a second thermal coefficient of expansion slideably engaged within said sleeve, and means whereby said mandrel is joined to said sleeve at a single predetermined location along said mandrel axial length; thereby to form a lead screw assembly;
    means associated with said mandrel for constraining said mandrel from axial translation while permitting rotational motion.

2. The invention set forth in claim 1, further defined in that said first and second materials are such that said first thermal coefficient of expansion is unlike said second thermal coefficient of expansion.

3. The invention set forth in claim 1 further defined in that said first and second materials are such that said first thermal coefficient of expansion is greater than said second coefficient of expansion.

4. The invention set forth in claim 1 further defined in that said first and second materials are such that said first thermal coefficient of expansion is less than said second coefficient of expansion.

5. The invention set forth in claim 1 further defined in that said first material is a metal particularly characterized by its relatively low thermal coefficient of expansion, and said second material is a metal selected to have greater predetermined thermal coefficient of expansion.

6. Apparatus according to claim 5 in which said predetermined location of joining is substantially at the ends of said sleeve and mandrel opposite said head portion.

7. Apparatus according to claim 5 in which said predetermined location of joining is at an intermediate axial location along said mandrel and said sleeve within the range of engagement between said lead screw assembly and said member for controlling the axial translation of apparatus to vary a parameter, thereby to provide a net coefficient of thermal expansion which changes between positive and negative as said predetermined location of joining passes through said engagement with said member for controlling the axial translation.

8. The invention set forth in claim 7 in which said means whereby said mandrel is joined to said sleeve at a single predetermined location is a fused metal bond.

9. The invention set forth in claim 1 further defined in that said first material is a metal particularly characterized by its relatively high thermal coefficient of expansion and said second material is a metal selected to have a lower thermal coefficient of expansion.

10. In a vacuum variable electrical component having an extendable metal bellows and a shaft adapted to exert a force thereon to mechanically control a parameter within an evacuated envelope, the combination comprising:
    a lead screw assembly comprising an elongated threaded sleeve of material having a first thermal coefficient of expansion, and an elongated mandrel of material having a second thermal coefficient of expansion, extending axially within said threaded sleeve in a sliding fit, said mandrel having a head protruding beyond said threaded sleeve;
    means rigidly joining said mandrel to said threaded sleeve at a single predetermined location along the axial length of said threaded sleeve;
    a threaded collar joined to the control end of said shaft and engaged with the threads of said threaded sleeve, whereby rotation of said lead screw assembly causes axial translation of said shaft against said bellows;
    and means associated with the said mandrel head for permitting rotation of said lead screw assembly while preventing axial movement thereof, thereby to provide a predetermined variation of the effective thermal coefficient of expansion of said lead screw at said threaded collar as a function of rotation of said lead screw assembly.